United States Patent
Ootaka

(10) Patent No.: US 8,405,408 B2
(45) Date of Patent: Mar. 26, 2013

(54) CAPACITIVE OCCUPANT DETECTION APPARATUS

(75) Inventor: Kouji Ootaka, Toyohashi (JP)

(73) Assignee: Denso Corporation, Kariya (JP)

( * ) Notice: Subject to any disclaimer, the term of this patent is extended or adjusted under 35 U.S.C. 154(b) by 298 days.

(21) Appl. No.: 12/802,498

(22) Filed: Jun. 8, 2010

(65) Prior Publication Data

US 2010/0315099 A1 Dec. 16, 2010

(30) Foreign Application Priority Data

Jun. 16, 2009 (JP) ................................. 2009-143303

(51) Int. Cl.
*G01R 27/26* (2006.01)
*G08B 13/26* (2006.01)

(52) U.S. Cl. ....................................... 324/679; 340/562

(58) Field of Classification Search .................. 324/519, 324/548, 658, 661, 686, 679; 340/561, 562, 340/565

See application file for complete search history.

(56) References Cited

U.S. PATENT DOCUMENTS

| | | | |
|---|---|---|---|
| 6,283,504 B1 | 9/2001 | Stanley et al. | |
| 6,378,900 B1 | 4/2002 | Stanley et al. | |
| 6,392,542 B1 | 5/2002 | Stanley | |
| 6,517,106 B1 | 2/2003 | Stanley et al. | |
| 6,520,535 B1 | 2/2003 | Stanley et al. | |
| 6,563,231 B1 | 5/2003 | Stanley et al. | |
| 6,577,023 B1 | 6/2003 | Stanley et al. | |
| 6,825,765 B2 | 11/2004 | Stanley et al. | |
| 7,135,983 B2 * | 11/2006 | Filippov et al. | 340/667 |
| 7,180,306 B2 | 2/2007 | Stanley et al. | |
| 7,271,730 B2 * | 9/2007 | Kimura et al. | 340/667 |
| 7,791,476 B2 * | 9/2010 | Hawkins et al. | 340/561 |
| 2003/0009273 A1 * | 1/2003 | Stanley et al. | 701/45 |
| 2003/0216886 A1 | 11/2003 | Hattori et al. | |
| 2005/0275202 A1 | 12/2005 | Wato et al. | |
| 2006/0164254 A1 * | 7/2006 | Kamizono et al. | 340/667 |
| 2006/0170411 A1 * | 8/2006 | Kurachi et al. | 324/132 |

(Continued)

FOREIGN PATENT DOCUMENTS

| | | |
|---|---|---|
| JP | 11-271463 | 10/1999 |
| JP | 2000-153749 | 6/2000 |

(Continued)

OTHER PUBLICATIONS

Office action dated May 17, 2011 in corresponding Japanese Application No. 2009-143303.

*Primary Examiner* — Jeff Natalini
(74) *Attorney, Agent, or Firm* — Harness, Dickey & Pierce, PLC

(57) ABSTRACT

A capacitive occupant detecting apparatus includes a voltage applying portion, a capacitance sensor, a capacitor, a storing portion, a measuring portion, and a calculating portion. The voltage applying portion applies an alternating-current voltage signal to the capacitance sensor and the capacitor. The storing portion stores a reference voltage. The measuring portion detects a first voltage in accordance with an electric current that flows between the voltage applying portion and the capacitor when the alternating-current voltage signal is applied to the capacitor. The measuring portion detects a second voltage in accordance with an electric current output from the capacitance sensor when the alternating-current voltage is applied to the capacitance sensor. The calculating portion detects an abnormality of the voltage applying portion based on the first voltage and the reference voltage, and determines an object disposed on the seat based on the second voltage.

1 Claim, 4 Drawing Sheets

U.S. PATENT DOCUMENTS

| | | |
|---|---|---|
| 2007/0159178 A1 | 7/2007 | Stanley et al. |
| 2008/0048680 A1* | 2/2008 | Hargreaves et al. .......... 324/686 |
| 2008/0100425 A1* | 5/2008 | Kiribayashi ............... 340/425.5 |
| 2008/0198024 A1 | 8/2008 | Kamizono et al. |

FOREIGN PATENT DOCUMENTS

| | | |
|---|---|---|
| JP | 2003-329508 | 11/2003 |
| JP | 2006-27591 | 2/2006 |
| JP | 2006-117090 | 5/2006 |
| JP | 2006-201129 | 8/2006 |
| JP | 2008-203150 | 9/2008 |
| JP | 2008-232859 | 10/2008 |

* cited by examiner

CAPACITIVE OCCUPANT DETECTION APPARATUS

CROSS REFERENCE TO RELATED APPLICATIONS

The present application is based on and claims priority to Japanese Patent Application No. 2009-143303 filed on Jun. 16, 2009, the contents of which are incorporated in their entirety herein by reference.

BACKGROUND OF THE INVENTION

1. Field of the Invention

The present invention relates to a capacitive occupant detection apparatus.

2. Description of the Related Art

A conventional capacitive occupant detection apparatus includes an occupant detection electronic control unit (ECU) and a capacitance sensor having a mat shape, and the capacitance sensor outputs electric current or voltage in accordance with a change in a weak electric field generated between a first electrode disposed in a seat and a vehicle body as described, for example, in JP-A-11-271463.

When the seat is empty, air is inserted between a pair of electrodes in the capacitance sensor. When a child restraint system (CRS) is disposed on the seat, the CRS is inserted between the pair of electrodes in the capacitance sensor. When an occupant sits on the seat, a body of the occupant is inserted between the pair of electrodes in the capacitance sensor. Air has a relative permittivity of about 1. A CRS has a relative permittivity of from about 2 to about 5, and the relative permittivity depends of a material of the CRS. A human body has a relative permittivity of about 50. As described above, air, a CRS, and a human body have different relative permittivities. Thus, a capacitance between the pair of electrodes in the capacitance sensor depends on an object inserted between the pair of electrodes.

The capacitance sensor outputs electric current or voltage in accordance with the change in the weak electric field generated between the pair of electrodes due to the difference in the capacitance. The occupant detection ECU determines whether the seat is empty, a CRS is disposed on the seat, or an adult sits on the seat based on the electric current or the voltage output from the capacitance sensor. An airbag ECU allows or prohibits an inflation of an airbag based on the determination result of the occupant detection ECU. When the occupant detection ECU determines that the seat is empty or a CRS is disposed on the seat, the airbag ECU prohibits the inflation of the airbag. When the occupant detection ECU determines that an adult sits on the seat, the airbag ECU allows the inflation of the airbag.

US 2005/0275202 A1 (corresponding to JP-A-2006-27591) discloses a capacitance sensor that detects whether a seat is wet so as to determine whether an occupant sits on the seat or the seat is empty more accurately. Water has a relative permittivity of about 80. Because the relative permittivity of water is greater than the relative permittivity of a human body, when the seat is wet, the occupant ECU is difficult to detect an occupant with accuracy. Thus, a sub electrode is provided in the capacitance sensor for detect a wetness. The capacitance sensor detects a change in an electric field between the sub electrode and a main electrode and outputs a detected result as electric current or voltage so that the occupant ECU can determine the wetness.

US 2006/0164254 A1 (corresponding to JP-A-2006-201129) discloses a capacitance sensor that includes a guard electrode for reducing a capacity. When a seat is empty, the capacitance sensor reduces electric current that flows between a pair of electrodes for an occupant determination. When an occupant sits on the seat, the capacitance sensor can detect electric current that flows between the pair of electrodes. When an occupant detection ECU applies a sine wave having a high frequency and a low voltage to the guard electrode and a vehicle ground, a capacitance is generated among the main electrode, a human body, and the vehicle ground, and the occupant detection ECU detects electric current in accordance with the capacitance.

In the capacitive occupant detection apparatus, a drift phenomenon may occur. In the drift phenomenon, properties of circuit components in the occupant detection ECU such as a signal source for generating a sine wave gradually change due to self-heating caused by operations of the circuit components and increase in ambient temperature. When amplitude of the sine wave generated from the signal source changes, the occupant detection ECU is difficult to detect an occupant with accuracy. JP-A-2000-153749 discloses an occupant detection system. Even when amplitude of a sine wave generated from a signal source changes due to the drift phenomenon, the occupant detection system can detect an occupant with accuracy by compensating the change in the amplitude.

In the occupant detection system, when a frequency of the sine wave applied to the capacitance sensor becomes abnormal, a capacitance value measured by the capacitance sensor becomes abnormal. However, the occupant detection system cannot detect abnormality of the frequency of the sine wave.

SUMMARY OF THE INVENTION

In view of the foregoing problems, it is an object of the present invention to provide a capacitive occupant detection apparatus that can detect an abnormality of a voltage applying portion which applies an alternating-current voltage signal to a capacitance sensor.

A capacitive occupant detecting apparatus according to an aspect of the present invention includes a voltage applying portion, a capacitance sensor, a line, a capacitor, a storing portion, a measuring portion, and a calculating portion. The voltage applying portion is configured to generate an alternating-current voltage signal. The capacitance sensor includes an electrode disposed in a seat of a vehicle. The capacitance sensor is configured to output an electric current in accordance with a change in an electric field generated between the electrode and a vehicle body when the alternating-current voltage signal is applied to the electrode. The vehicle body is coupled with a vehicle grounded portion. The line couples the voltage applying portion and the capacitance sensor. The capacitor is coupled with the line so as to be applied with the alternating-current voltage signal. The storing portion is configured to store a reference voltage. The measuring portion is configured to detect a first voltage in accordance with an electric current that flows between the voltage applying portion and the capacitor when the alternating-current voltage signal is applied to the capacitor. The measuring portion is also configured to detect a second voltage in accordance with the electric current output from the capacitance sensor when the alternating-current voltage is applied to the capacitance sensor. The calculating portion is configured to detect an abnormality of the voltage applying portion based on the first voltage and the reference voltage. The calculating portion is also configured to determine an object disposed on the seat based on the second voltage.

The capacitive occupant detecting apparatus can detect an abnormality of the voltage applying portion based on the first voltage and the reference voltage. Thus, the capacitive occupant detecting apparatus can determine the object on the seat with accuracy.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

Figure 1:
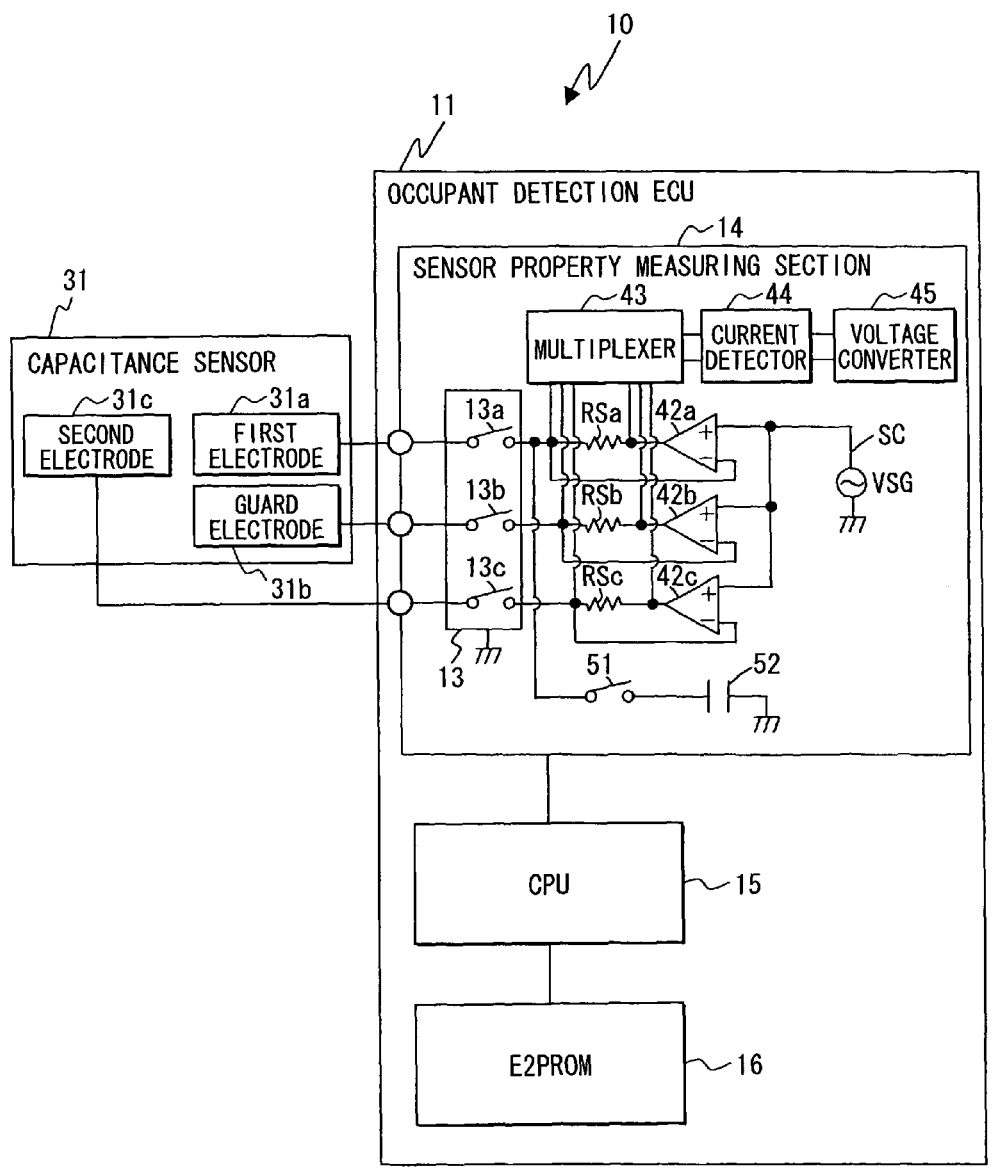
FIG. 1 is a block diagram showing a capacitive occupant detection apparatus according to an exemplary embodiment of the present invention.

A capacitive occupant detection apparatus 10 according to an exemplary embodiment of the present invention will be described with reference to FIG. 1. The capacitive occupant detection apparatus 10 includes an occupant detection ECU 11 and a capacitance sensor 31 coupled with the occupant detection ECU 11. The capacitance sensor 31 includes a first electrode 31a, a second electrode 31c, and a guard electrode 31b. The first electrode 31a is disposed in a seat of the vehicle. In the seat, the second electrode 31c is disposed to a front side of the first electrode 31a so as to be away from the first electrode 31a. The guard electrode 31b is disposed between the first electrode 31a and a vehicle body so as to be away from the first electrode 31a. The vehicle body is coupled with a vehicle grounded portion (not shown).

The occupant detection ECU 11 includes a sensor property measuring section 14, a CPU 15, and an $E^2$PROM 16 as a nonvolatile memory. The sensor property measuring section 14 includes a switching part 13, current detecting resistors RSa, RSb, and RSc, operational amplifiers 42a, 42b, and 42c, and a signal source VSG. The switching part 13 includes a first electrode coupling switch 13a, a guard electrode coupling switch 13b, and a second electrode coupling switch 13c. The current detecting resistors RSa, RSb, and RSc are coupled with the first electrode coupling switch 13a, the guard electrode coupling switch 13b, and the second electrode coupling switch 13c, respectively. The operational amplifiers 42a, 42b, and 42c are coupled with the current detecting resistors RSa, RSb, and RSc, respectively, and can function as drivers. The signal source VSG is coupled with non-inverting input terminals of the operational amplifiers 42a-42c. The sensor property measuring section 14 further includes a multiplexer 43, a current detector 44, a voltage converter 45, switch 51, and a reference capacitor 52. The multiplexer 43 is coupled with two ends of each of the current detecting resistors RSa-RSc and selects one of the current detecting resistors RSa-RSc. The current detector 44 detects electric current that flows in one of the current detecting resistors RSa-RSc selected by the multiplexer 43. The voltage converter 45 converts the electric current detected by the current detector 44 into a voltage value. One end of the reference capacitor 52 is coupled between the first electrode coupling switch 13a and the current detecting resistor RSa through the switch 51, and the other end of the reference capacitor 52 is coupled with the ground.

The signal source VSG can function as a voltage applying portion and outputs a sine wave SC as an alternating-current voltage signal. When the first electrode coupling switch 13a, the guard electrode coupling switch 13b, and the second electrode coupling switch 13c are selectively turned on and the sine wave SC is input from the signal source VSG to the capacitance sensor 31 through the operational amplifiers 42a-42c and the current detecting resistors RSa-RSc, potential difference is generated at each of the current detecting resistors. RSa-RSc in accordance with an impedance of an object disposed on the capacitance sensor 31. The multiplexer 43 selects the potential differences in turn and outputs the selected potential difference to the current detector 44. The current value detected by the current detector 44 is converted into the voltage value by the voltage converter 45. By the above-described way, the capacitances detected at the first electrode 31a and the second electrode 31c are measured as the voltage values. The CPU 15 adds the measured value of the capacitance at the first electrode 31a and the measured value of the capacitance at the second electrode 31c. The added value is used as occupant determination data. The occupant determination data is numerical data used for determining a state of the seat. The first electrode coupling switch 13a, the guard electrode coupling switch 13b, and a second electrode coupling switch 13c can also couple the first electrode 31a, the guard electrode 31b, and the second electrode 31c to the vehicle ground, respectively.

Based on the occupant determination data, the CPU 15 determines whether the seat is empty, a CRS is disposed on the seat, a child sits on the seat, or an adult sits on the seat. The CPU 15 outputs a determination result of whether an absorber should be inflated or non-inflated to an absorber ECU. When the vehicle collides, the absorber ECU controls inflation and non-inflation of the absorber based on the determination result of the CPU 15 and a collision determination result.

As described above, the switching part 13 is controlled, and the capacitances are measured based on electric lines of force generated in the capacitance sensor 31. The capacitances are measured by applying the sine wave SC from the signal source VSG to the capacitance sensor 31, and converting the electric current that flows in each of the current detecting resistors RSa-RSc to the voltage. The CPU 15 determines an occupant based on the capacitance generated between the first electrode 31a and the vehicle ground when the first electrode coupling switch 13a and the guard electrode coupling switch 13b are in the on-position. The CPU 15 also determines an occupant based on the capacitance generated between the second electrode 31c and the vehicle ground when the guard electrode coupling switch 13b and the second electrode coupling switch 13c are in the on-position. The CPU 15 determines the wetness of the seat based on the capacitance generated between the first electrode 31a and the second electrode 31c when the first electrode coupling switch 13a, the guard electrode coupling switch 13b, and the second electrode coupling switch 13c are in the on position.

The capacitive occupant detection apparatus 10 according to the present embodiment includes the reference capacitor 52 having a small characteristic variation. The capacitive occupant detection apparatus 10 previously store a reference voltage which is obtained when, the sine wave SC having a predetermined frequency is applied to the reference capacitor 52. When a measured voltage which is obtained when the sine wave SC is applied to the reference capacitors 52 is equal to the reference voltage, the capacitive occupant detection apparatus 10 determines that the frequency of the sine wave SC is normal. When the measured voltage is not equal to the reference voltage, the capacitive occupant detection apparatus 10 determines that the frequency of the sine wave SC is abnormal. The reference capacitor 52 may have a capacitance similar to the capacitance generated between the first electrode 31a and the vehicle ground.

An exemplary process for determining whether the frequency of the sine wave SC is normal or abnormal will be described with reference to FIG. 2 and FIG. 3.

Figure 2:
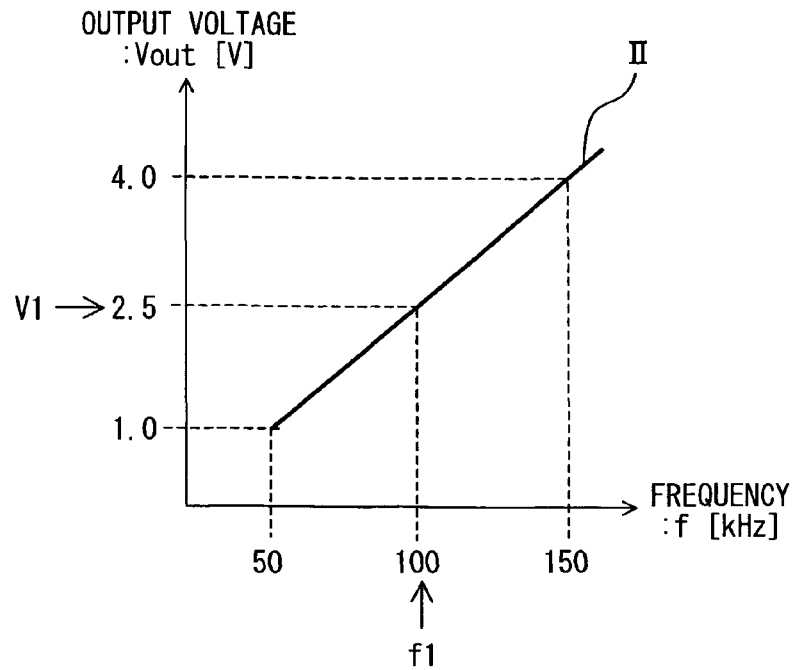
FIG. 2 is a graph showing a relationship between a reference frequency of a sine wave and a reference voltage.

When the reference capacitor 52 is applied with the sine wave SC having a predetermined frequency f1, a reference voltage V1 can be obtained as shown by line II in FIG. 2. For example, when the reference capacitor 52 has a capacitance of 100 pF and the reference frequency is 100 kHz, the reference voltage V1 is 2.5 V. The reference capacitor 52 is coupled between the first electrode coupling switch 13a and the current detecting resistor RSa. The sine wave SC having the predetermined frequency f1 is applied from the signal source VSG to the reference capacitor 52 through the operational amplifier 42a and the current detecting resistor RSa. The multiplexer 43 selects the two ends of the current detecting resistor RSa, and the voltage converter 45 detects a voltage through the current detector 44. A logical voltage equal to the voltage detected by the voltage converter 45 is stored as the reference voltage V1 in a ROM in the CPU 15. The reference voltage V1 may also be stored in the E$^2$PROM 16. Each of the ROM and the E$^2$PROM 16 can function as a storing portion.

Figure 3:
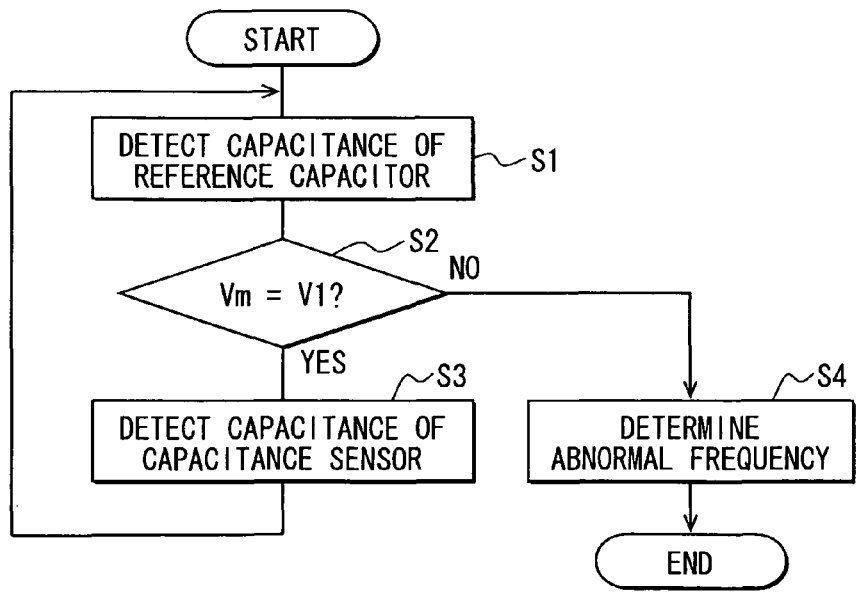
FIG. 3 is a flowchart showing a process of determining abnormality of a frequency of a sine wave.

In the process shown in FIG. 3, the capacitive occupant detection apparatus 10 detects the capacitances of the reference capacitor 52 at S1. While the vehicle is operated, each of the first electrode coupling switch 13a, the guard electrode coupling switch 13b, and the second electrode coupling switch 13c are turned off, and the switch 51 is turned on. Then, the sine wave SC is applied from the signal source VSG to the reference capacitor 52 through the operational amplifier 42a and the current detecting resistor RSa. When the sine wave SC is applied to the reference capacitor 52, the multiplexer 42 selects the two ends of the current detecting resistor RSa.

The voltage converter 45 detects a measurement voltage Vm through the current detector 44. At S2, the CPU. 15 compares the measurement voltage Vm with the reference voltage V1 stored in the ROM in the CPU 15. When the measurement voltage Vm is equal to the reference voltage V1, which corresponds to "YES" at S2, the CPU 15 determines that the frequency of the sine wave SC is normal, and the process proceeds to S3. At S3, the capacitance of the capacitance sensor 31 is detected. The switch 51 is turned off, and the first electrode coupling switch 13a, the guard electrode coupling switch 13b, and the second electrode coupling switch 13c are selectively turned on. The sine wave SC is applied from the signal source VSG to the capacitance sensor 31 through the operational amplifiers 41a-42c and the current detecting resistors RSa-RSc, and thereby the capacitance of the capacitance sensor 31 is detected.

When the measurement voltage Vm is not equal to the reference voltage V1, which corresponds to "NO" at S2, the process proceeds to S4. At S4, the CPU 15 determines that the frequency of the sine wave SC is abnormal. The determination result may be displayed at a display device so that an occupant of the vehicle can realize the determination result.

The capacitive occupant detection apparatus 10 includes the capacitance sensor 31, the signal source VSG, the sensor property measuring section 14, and the CPU 15. The capacitance sensor 31 includes a first electrode 31a disposed in the seat of the vehicle. When the first electrode 31a is applied with the sine wave SC, and the, capacitance sensor 31 outputs the electric current in accordance with the change in the electric field generated between the first electrode 31a and the vehicle body coupled with the vehicle grounded portion. The signal source VSG can function as the voltage applying portion configured to apply the sine wave SC to the capacitance sensor 31. The sensor property measuring section 14 includes a measuring portion configured to detect the voltage in accordance with the electric current from the capacitance sensor 31. The CPU 15 can function as a calculating portion and determines an object on the seat based on the voltage detected by the sensor property measuring section 14.

The capacitive occupant detection apparatus 10 further includes the reference capacitor 52 and a storing portion. The signal source SC and the capacitance sensor 31 is coupled through a line, and the reference capacitor 52 is coupled with the line so as to be applied with the sine wave SC. The ROM in the CPU 15 or the E$^2$PROM 16 can function as the storing portion and stores the reference voltage V1. When the sine wave SC is applied to the reference capacitor 52 instead of the capacitance sensor 31 and the measurement voltage Vm detected by the sensor property measuring section 14 is not equal to the reference voltage V1 stored in the storing portion, the CPU 15 determines that the frequency of the sine wave SC is abnormal.

When the sine wave having a frequency different from the predetermined frequency is applied to the reference capacitor 52 instead of the capacitance sensor 31, the measurement voltage Vm detected by the sensor property measuring section 14 is different from the reference voltage V1 which can be detected when the sine wave SC has the predetermined frequency. Thus, when the sine wave SC is applied to the reference capacitor 52 instead of the capacitance sensor 31 and the measurement voltage Vm is not equal to the reference voltage V1, the CPU 15 can determine that the frequency of the sine wave SC is abnormal. If the determination result of the CPU 15 is displayed at a display device, an occupant of the vehicle can realize that the capacitive occupant detection apparatus 10 is abnormal. When the CPU 15 determines that the frequency of the sine wave SC is normal, the capacitive occupant detection apparatus 10 begins to detect the capacitance of the capacitance sensor 31. Thus, the CPU 15 can detect the capacitance of the capacitance sensor 31 with accuracy.

Figure 4:
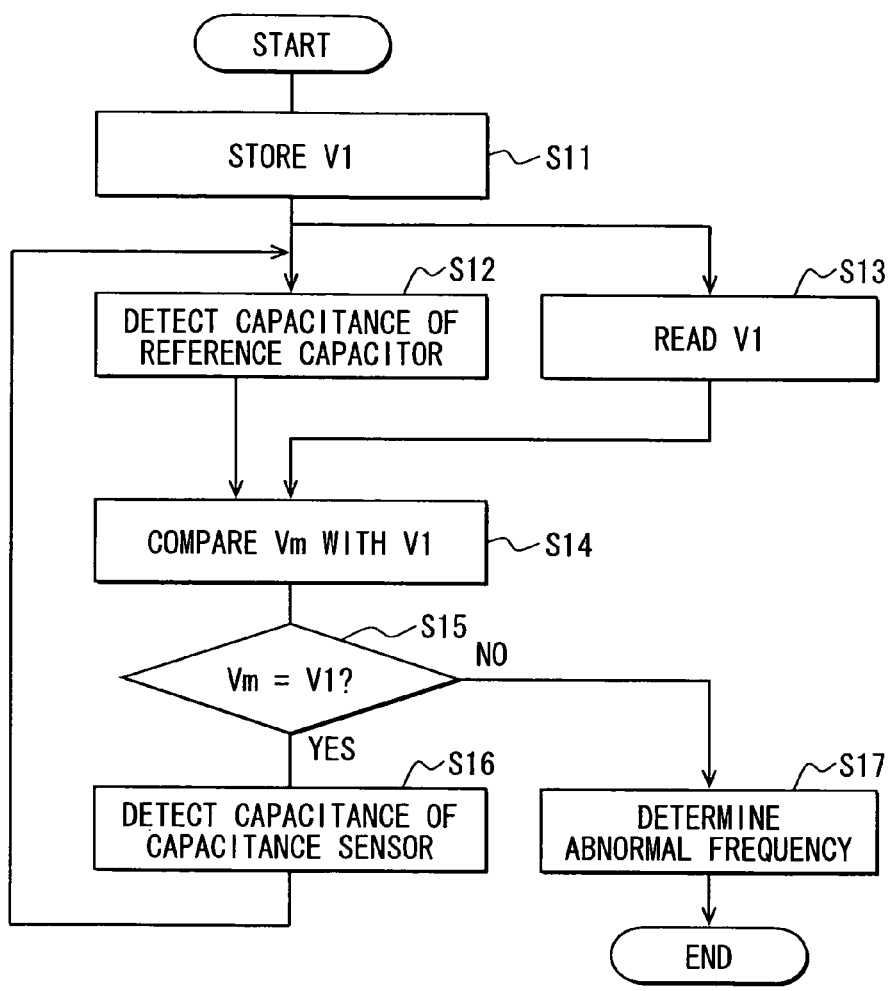
FIG. 4 is a flowchart showing another process of determining abnormality of a frequency of a sine wave.

In the above-described embodiment, the reference capacitor 52 has a small characteristic variation. When a reference capacitor 52 having a standard accuracy is used, the CPU 15 may determine whether the frequency of the sine wave SC is abnormal as shown in FIG. 4.

At S11, the reference voltage V1 is previously stored in the E$^2$PROM 16 before the vehicle is operated. For example, the reference voltage V1 is stored in an inspection process. The first electrode coupling switch 13a, the guard electrode coupling switch 13b, and the second electrode coupling switch 13c are turned off, and the switch 51 is turned on. The sine wave SC is applied from the signal source VSG to the reference capacitor 52 through the operational amplifier 42a and the current detecting resistor RSa, and the multiplexer 42 selects the two ends of the current detecting resistor RSa. The voltage converter 45 converts an electric current value detected at the current detector 44 into a voltage value, and the voltage value is stored as the reference voltage V1 in the E$^2$PROM 16.

At S12, the capacitance of the reference capacitor 52 is detected while the vehicle is detected. Each of the first electrode coupling switch 13a, the guard electrode coupling switch 13b, and the second electrode coupling switch 13c are turned off, and the switch 51 is turned on. Then, the sine wave SC is applied from the signal source VSG to the reference capacitor 52 through the operational amplifier 42a and the current detecting resistor RSa. When the sine wave SC is applied to the reference capacitor 52 and the multiplexer 43 selects the two ends of the current detecting resistor RSa, the voltage converter 45 detects a measurement voltage Vm through the current detector 44. At S13, the CPU 15 reads the reference voltage V1 from the E²PROM 16. At S14, the CPU 15 compares the measurement voltage Vm with the reference voltage V1.

At S15, the CPU 15 determines whether the measurement voltage Vm is equal to the reference voltage V1. When the. CPU 15 determines that the measurement voltage Vm is equal to the reference voltage V1, which corresponds to "YES" at S15, the process proceeds to S16. At S16, the capacitance of the capacitance sensor 31 is detected. The switch 51 is turned off, and the first electrode coupling switch 13a, the guard electrode coupling switch 13b, and the second electrode coupling switch 13c are selectively turned on. The sine wave SC is applied from the signal source VSG to the capacitance sensor 31 through the operational amplifiers 41a-42c and the current detecting resistors RSa-RSc, and thereby the capacitance of the capacitance sensor 31 is detected.

When the measurement voltage Vm is not equal to the reference voltage V1, which corresponds to "NO" at S15, the process proceeds to S17. At S17, the CPU 15 determines that the frequency of the sine wave SC is abnormal. The determination result may be displayed at a display device so that an occupant of the vehicle can realize the determination result.

When the reference capacitor 52 having the standard accuracy is used, a component cost can be reduced compared with a case where a capacitor having a small characteristic variation is used. The reference capacitor 52 may also be disposed outside the sensor property measuring section 14. When the sensor property measuring section 14 is formed into a custom IC and the reference capacitor 52 is disposed in the sensor property measuring section 14, the component cost can be reduced.

Figure 5:
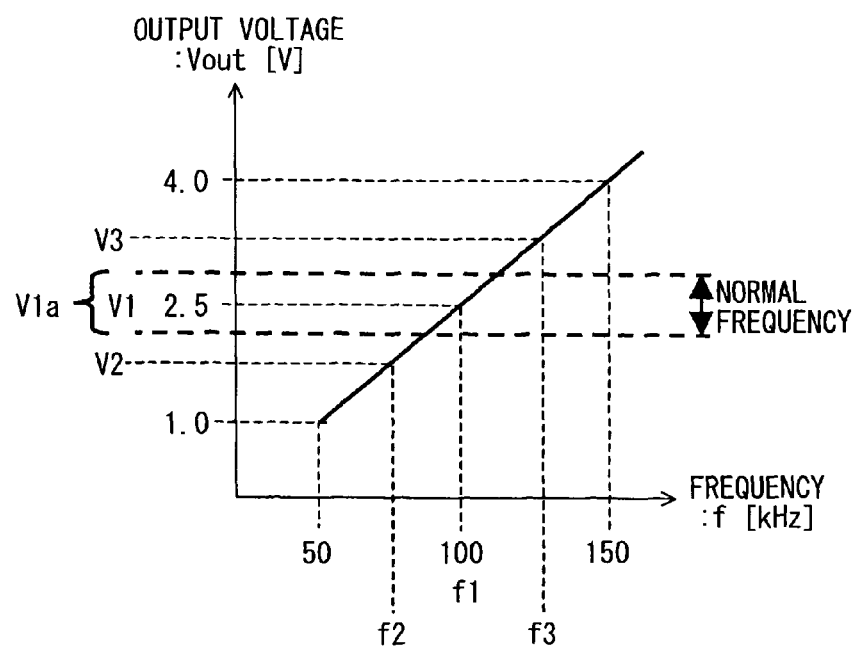
FIG. 5 is a graph showing a relationship between a normal frequency range of a sine wave and a predetermined voltage range.

In the above-described embodiments, the reference voltage is set to a voltage V1 (for example, 2.5 V) corresponding to the predetermined frequency f1 of the sine wave SC. As shown in. FIG. 5, the reference voltage may have a predetermined voltage range V1a centering on the voltage V1. The predetermined voltage range V1a may be previously stored in the storing portion. When the sine wave SC is applied to the reference capacitor 52 instead of capacitance sensor 31 and the measurement voltage Vm is out of the predetermined voltage range V1a, the CPU 15 may determine that the frequency of the sine wave SC is abnormal. In this method, the CPU 15 can determine whether the frequency of the sine wave SC is abnormal based on whether the measured voltage Vm is out of the predetermined voltage range V1a. Thus, the frequency of the sine wave SC can have a normal frequency range which is acceptable to detect the capacitance of the capacitance sensor 31 with accuracy.

When the measurement voltage Vm detected by the sensor property measuring section 14 is a voltage V2 less than the predetermined voltage range V1a, the CPU 15 may determine that the frequency of the sine wave SC is an abnormally decrease frequency f2. When the measured voltage Vm is a voltage V3 greater than the predetermined voltage range V1a, the CPU 15 may determine that the frequency of the sine wave SC is an abnormally increase frequency f3. When the measured voltage Vm is within the predetermined voltage range V1a, the CPU 15 may determine that the frequency of the sine wave SC is normal.

What is claimed is:

1. A capacitive occupant detecting apparatus comprising:
a voltage applying portion configured to generate an alternating-current voltage signal;
a capacitance sensor including an electrode disposed in a seat of a vehicle, the capacitance sensor configured to output an electric current in accordance with a change in an electric field generated between the electrode and a vehicle body when the alternating-current voltage signal is applied to the electrode, the vehicle body coupled with a vehicle grounded portion;
a line coupling the voltage applying portion and the capacitance sensor;
a capacitor coupled with the line so as to be applied with the alternating-current voltage signal;
a storing portion configured to store a reference voltage;
a measuring portion configured to detect a first voltage in accordance with an electric current that flows between the voltage applying portion and the capacitor when the alternating-current voltage signal is applied to the capacitor, the measuring portion configured to detect a second voltage in accordance with the electric current output from the capacitance sensor when the alternating-current voltage is applied to the capacitance sensor; and
a calculating portion configured to detect an abnormality of the voltage applying portion based on the first voltage and the reference voltage, the calculating portion configured to determine an object disposed on the seat based on the second voltage;
a first switch disposed on the line coupling the voltage applying portion and the capacitance sensor; and
a second switch disposed on another line coupling the voltage applying portion and the capacitor; wherein
when the first voltage is different from the reference voltage, the calculating portion determines that a frequency of the alternating-current voltage signal is abnormal; and
the capacitor is applied with the alternating-current voltage signal when the first switch is turned off and the second switch is turned on.

* * * * *